United States Patent [19]

Fichtner et al.

[11] 4,439,100
[45] Mar. 27, 1984

[54] DEVICE FOR SEPARATING AND TAKING OFF OF SHEETS FROM A STACK

[76] Inventors: Karl-Heinz Fichtner, Von Eiff Str. 11, 6450 Hanau am Main 7; Willi Kramer, Schlesienring 20, 6368 Bad Vilbel 2; Willi Muskulus, An der Pfaffenmauer 17, 6000 Frankfurt am Main 60, all of Fed. Rep. of Germany

[21] Appl. No.: 214,101

[22] Filed: Dec. 8, 1980

[51] Int. Cl.³ .............................................. B65G 59/06
[52] U.S. Cl. .................................... 414/115; 414/129; 414/131
[58] Field of Search ................. 414/131, 129, 115, 32, 414/33, 112, 125; 271/3.1; 221/238, 251, 268, 269, 270, 271, 272, 273, 274, 275, 276

[56] References Cited

U.S. PATENT DOCUMENTS

| | | | |
|---|---|---|---|
| 3,149,750 | 9/1964 | Kulbicki et al. | 414/131 X |
| 3,652,084 | 3/1972 | Eberle | 414/129 X |
| 3,690,476 | 9/1972 | Stacy | 414/115 |
| 3,708,094 | 1/1973 | Koether et al. | 414/112 |
| 3,741,410 | 6/1973 | Henschke et al. | 414/129 |
| 3,973,767 | 8/1976 | Kramer | 414/129 X |

Primary Examiner—Robert J. Spar
Assistant Examiner—Ken Muncy
Attorney, Agent, or Firm—Larson and Taylor

[57] ABSTRACT

A device for separating and taking off of one or more notched stamped sheets from a stack of sheets located in a receiving magazine is provided. A tool having first and second tool parts which are movable relative to one another is used to remove the sheets. The first tool part includes a first surface which engages the notched sheets to cause the sheets to slide on one another in the plane of separation. The sliding movement of the sheets is of a limited distance such that the sheets do not come into engagement in the region of their notches. A second surface is also provided on the first or second tool part for engaging and applying pressure against at least one location of the sheets which is exposed during the relative sliding movement between the sheets. In this manner, the sliding sheets are separated from one another in a direction normal to the plane of separation and thereafter a relative transverse movement between the sliding sheets can take place without danger of catching.

15 Claims, 5 Drawing Figures

DEVICE FOR SEPARATING AND TAKING OFF OF SHEETS FROM A STACK

FIELD OF THE INVENTION

The invention relates to an apparatus for the separating and taking off of one or more stamped and notched sheets from a stack of such sheets.

BACKGROUND OF THE INVENTION

Notched sheets are used, for example, for the production of stators for electric motors. During stamping of the sheets, burrs develop so that the stacked sheets catch on one another. Often the sheets are also annealed, and thus bake together on unclean surfaces. Finally, it is often the case that the stamped, and optionally annealed, sheets delivered for production of the stators are not entirely even. Under these circumstances, where the sheets are to be pushed off "flat" from the stack, the sheets engage the burrs of the notches formed therein and hook together or otherwise stick to one another.

Further difficulties are also encountered if a specific number of sheets forming a packet are to be removed from the stack at one time. In this regard, a specific stator requires a specific height or thickness of the sheet packet. Packet formation of sheets delivered in stacks is difficult because there are substantial tolerances for the individual sheets, and these tolerances can add up in the overall sheet packet. For example, there is a distinct difference in height of the sheet stack or packet on diametrically opposite sides of the sheet cut if the starting material of the sheet was slightly wedge-shaped in cross section and the sheets are stacked in the position corresponding to that assumed in the stamping process. In addition, there are variations and tolerances in thickness and height because of the stamping burrs and dirt between the sheets.

Prior art devices of the type under consideration do not adequately deal with the difficulties indicated above. German Pat. No. OS 26 56 705 describes a pusher apparatus including a pusher which is yieldingly and resiliently spring mounted in a wedge-shaped guide in the direction of thrust which causes the lowermost sheet of a stack to be pushed out laterally and flat. Thus, if the pusher encounters resistance of some kind, the pusher can move downward in the wedge-shaped guide. However, this apparatus does not prevent sheets from engaging each other in the area of the notches when the "pushing off" operation occurs and thus hanging up on one another.

German Pat. No. 20 19 924 shows a packet device in which a sheet packet of specific height is taken off from the upper end of a stack which, in order to improve the precision of the operation, is placed under pressure. At the height of the stack corresponding to the plane of separation, crossed blades press obliquely upward and downward against the side edges of the adjacent sheets which are to be separated. The clamping load of the blades on the individual sheets is partly relieved by the pressure on the entire stack. The separated sheet packet is then received and lifted off by a tensioning mandrel. It is a disadvantage of this device that the work cannot be performed continuously because as the sheet packet is lifted off in this upward direction, the remaining stack must be held stationary until the sheet packet is clear. Moreover, it has been shown that the separation of firmly baked together sheets by means of the blade edges pressing laterally against the sheets does not always work acceptably. In addition, because the sheets have the sides opposite the blades pressing against a fixed guide, the main force of the blades is passed through the sheets to the fixed guide. Thus, in order to attain separation of the sheets, the force of the blades must be relatively great and these forces can lead to deformation of sheets that have been weakened by notches. It also happens rather frequently that the sheet stack cannot be separated in the correct planes because at this point the sheets cling together very firmly instead of being seated only loosely on one another. In this connection, it is also noted that the tolerances of the first stamped inner notches of the sheets are smaller than at the periphery resulting in bowed sheets. Thus, the obliquely placed blades do not always come into contact with the correct sheet. It should also be noted that this device is not suitable for taking off individual sheets from the stack or for manually operated devices.

SUMMARY OF THE INVENTION

The present invention concerns the problem of developing a device of the type in question by means of which even under the unfavorable conditions that occur in practice, notched stamped sheets can be taken off either from the upper or lower end of a stack without problems. The device proposed for the solution of this problem is characterized in that the sheets are pushed and/or rotated in a sliding movement. However, this sliding movement is relatively small so that the notches of the sheets do not come into engagement. Then, by pressing against at least one place which has been exposed during the sliding movement of one or both of the sheets sliding on each other, the sheets are separated normal to the plane of separation so that thereafter a relative transverse movement can take place without hooking.

In the operation of the present invention, two different locations on the sheets are successively pressed. First, the sheet is pressed on the inner or outer periphery or on another narrow side to cause a slight shifting or rotating movement. This movement is so slight that the stamping burrs on the notches do not abut against the edges of the notches of the adjacent sheets. However, this movement is sufficient to expose areas on the main surface of the sheets sliding relative to one another against which a force is then exerted in the axial direction of the stack to separate the sliding sheets.

In a preferred embodiment of the invention, the sheets that are to be taken off of the stack are braced during the sliding movement at a few narrowly limited places. At least one of the bracing points is adjacent the engagement points of the external forces that cause the sliding movement. This embodiment is particularly useful in the taking off of sheet packets because of the additive effect of the tolerances that occur in practice. In addition, this embodiment is particularly useful because the sliding movement is easier to achieve due to the relatively large separation of the points of engagement of the outer forces on the sheets and because the sheets are more easily separated due to the relatively large separation of the relatively small supporting points.

In another preferred embodiment of the invention, the sheets that are to be separated are first pressed apart only at a point on their periphery. Then, the sheets are separated diametrically and continuously outward. This embodiment is especially suitable for the taking off of single sheets or a few sheets from the lower end of a stack. The operation of this embodiment is such that one or more of the sheets to be taken off of the stack can be separated from the stack axially and at the same time, with a slight temporal overlap, also moved in a direction crosswise to the stack. The different movements can occur alternately or in succession.

In the embodiment which is particularly suitable for the taking off of packets of sheets from the stack, the last sheet to be taken off is positively engaged and held from above or below, depending upon whether the sheet is to be taken from the upper or lower end of the stack, during or after the sliding movement at the places which are exposed. The remaining sheets in the stack are then pushed or drawn away from the plane of separation. It is also possible, of course, after the engagement of the last sheet to be taken off, to have the measured packet pushed or drawn away from the plane of separation while the sheets remaining in the stack are held in place.

If it is desired to obtain a specific packet height as measured under pressure, it is possible to first form the packet as described above, but provided with about one to three less sheets than necessary. Then, after this packet formation, a precise measurement of the packet height under pressure can be made and one or more sheets can be added as indicated by the measurement. Advantageously, the uppermost sheet is laid on the stack so that there are no sharp edged burrs protruding on the outside, or on any side, of the packet stack.

Alternatively, it would also be possible to take off of the stack a sheet packet which is about one and a half times the final packet height. This oversized sheet packet is then measured under pressure at another work station and a final sheet packet of the correct height is formed. The remaining half height sheet packet is then inverted and returned to the packet station. With this procedure, outwardly protruding burrs are avoided. The division of the sheet packet which is initially oversized can be effected with great precision.

The device of the present invention is also well adapted to compensate for possibly wedge-shaped sheets. To accomplish this, about half of the sheet packet is rotated by 180° with reference to the vertical axis of the packet so that the thicker sheet edges in the lower and upper packet half are on opposite sides of the packet. In this manner, the flaws are balanced out.

The present invention includes a conventional magazine which receives a stack of stamped sheets and a packet tool. The packet tool has two tool parts that are movable relative to one another. To produce the sliding movement, the first tool part engages the sheet that is to be taken from the stack. The second tool part then engages the sheets remaining in the stack. The present invention differs from known devices in that the first tool part, which is either one piece or a plurality of pieces, is provided with a first surface or edge. This first surface or edge is used to move or rotate the sheets to be taken off. The sheets to be taken off are moved or rotated relative to the stack in their plane by a relatively short path or arc. At least one of the two tool parts is then provided with a second surface or edge. Immediately after the movement of the sheets caused by the first surface or edge has taken place and the contact surfaces of the sheets sliding relative to one another has been exposed, a force is applied normal to the plane of movement of the sheets at one or more points.

In a first embodiment of the invention, the two tool parts are movable relative to one another in a plane parallel to the planes of the sheets. The first tool part is provided with a forward surface or edge that presses against a side edge of the sheet that is to be taken off. The first tool part also has a wedge surface that presses against the adjacent side edge of the lowermost sheet remaining in the stack.

In another embodiment of the invention, the two tool parts are rotatable with reference to one another about an axis normal to the planes of the stacked sheets and have axially movable fingers or segments that engage in recesses in the sheets. The lateral surfaces or edges of the fingers of the first tool part press against the side edges of the recesses of the sheets that are to be taken off and rotate these sheets. The free ends of the first tool part also press against exposed points of the lowermost sheet remaining in the stack to lift the stack. The fingers of the second tool part have recesses into which the rotated sheets are received and held. The portion of the fingers above these recesses act to hold the remaining sheets in the stack against rotation.

With the present invention, a clearly defined, positive engagement of the sheets takes place during each stage of operation so that there is little risk of damage to the sheets. This engagement occurs during the first relative movement in the plane of separation, and then during the relative movement normal to the plane of the sheet, and finally during the further guiding of the separated sheet.

BRIEF DESCRIPTION OF THE DRAWINGS

Exemplary embodiments of the invention are discussed in detail below with reference to the attached drawings, in which.

DETAILED DESCRIPTION OF THE PREFERRED EMBODIMENTS

Figure 1:
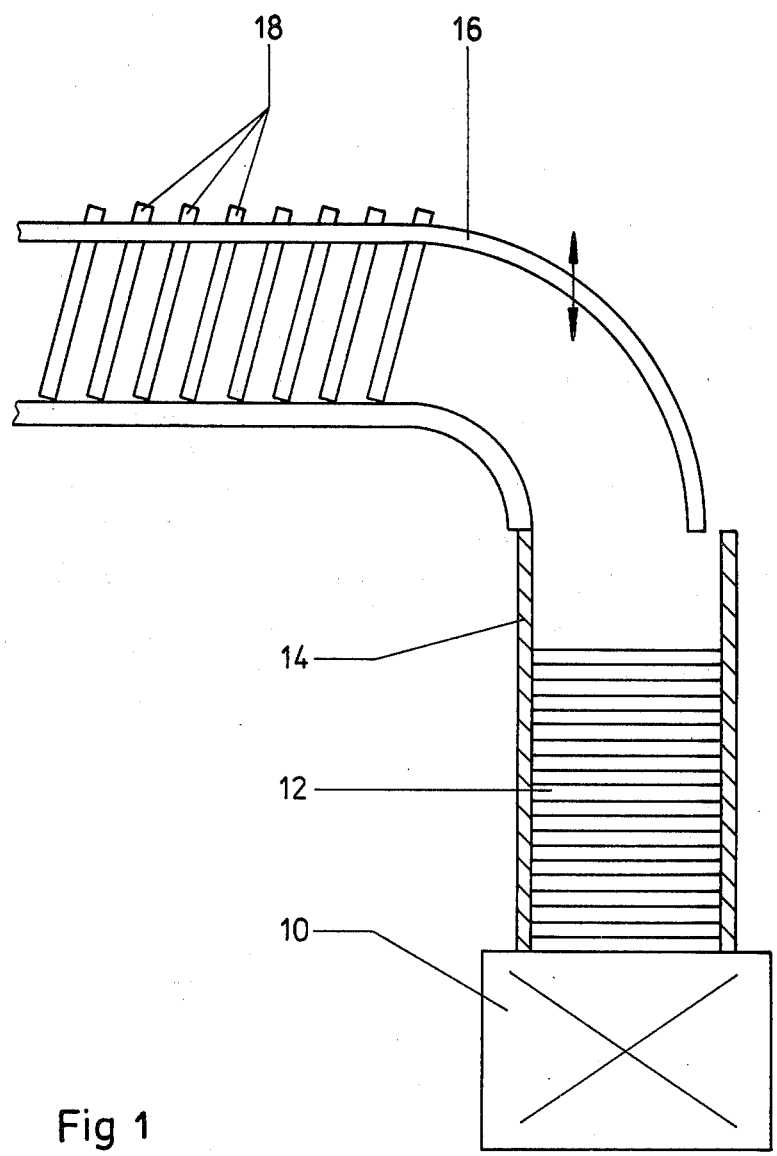
FIG. 1 is a schematic side elevational view of a device according to the invention for separating and taking off of sheets from the lower end of a continuously filled stack.

In FIG. 1 a preferred embodiment of the present invention is shown schematically and includes a device 10 according to the invention for separating and taking off of sheets from a stack 12. Device 10 is disposed at the lower end of stack 12 and movement of sheets 18 forming stack 12 is guided by a suitable magazine 14. With this arrangement, it is possible to feed other sheets 18 from the top, either individually or in stacks, into magazine 14 without hindering the separating or taking off of sheets 18 at the lower end of stack 12 by means of device 10. In the exemplary embodiment illustrated, sheets 18 are continuously charged individually into magazine 14 by a swing conveyor 16.

Figure 2A:
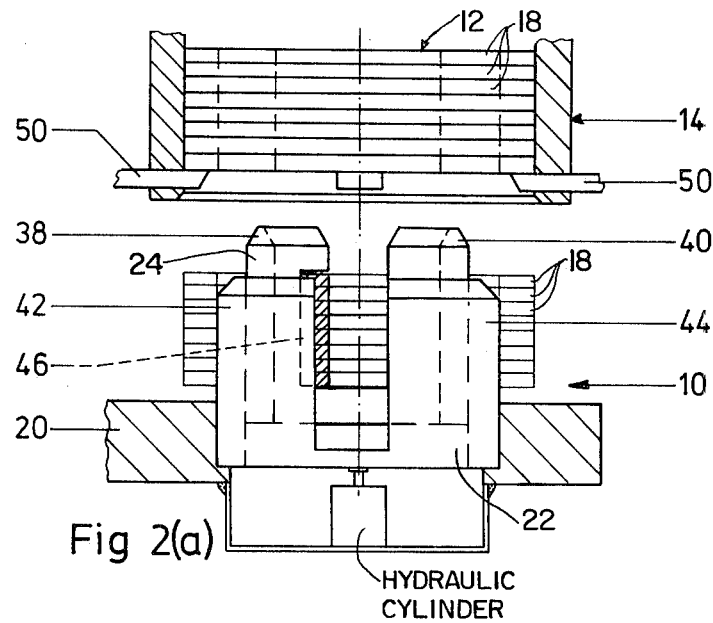
FIGS. 2(a) and 2(b) are a partially cut away lateral view and a top view, respectively, of the device shown in FIG. 1 for separating and taking off of sheets from the stack.

Referring to FIG. 2(a), device 10 is mounted on a turntable 20, in order to transport sheets 18 taken off of the lower end of stack 12 to a further processing station where, for example, sheets 18 are measured under pressure, partly rotated, turned or welded. Device 10 itself comprises, in this embodiment, a pair of concentric tool parts 22 and 24 which are rotatable with reference to one another about their common central axis and which are also axially movable. In this embodiment, only one of the two tool parts, e.g., radially outer tool part 22, must be rotatable with reference to turntable 20 and axially movable. The other tool part, e.g., radially inner tool part 24, can then be stationary with reference to turntable 20. The rotary drive mechanism and the axial drive mechanism of tool part 22 are not shown in the drawing for the sake of clarity. These drive mechanisms could, for example, comprise conventional hydraulic power cylinders.

The specific form of tool parts 22 and 24 is governed by the specific cut of the stamped sheets. In the embodiment illustrated in FIG. 2(b), the sheets are round and have two inner arcuate recesses 26 and 28 in symmetrical arrangement which are separated by two relatively narrow crosspieces 30 and 32. Further, notches 34 and 36 extend from arcuate recesses 26 and 28 to the outer periphery of sheet 18.

Figure 2B:
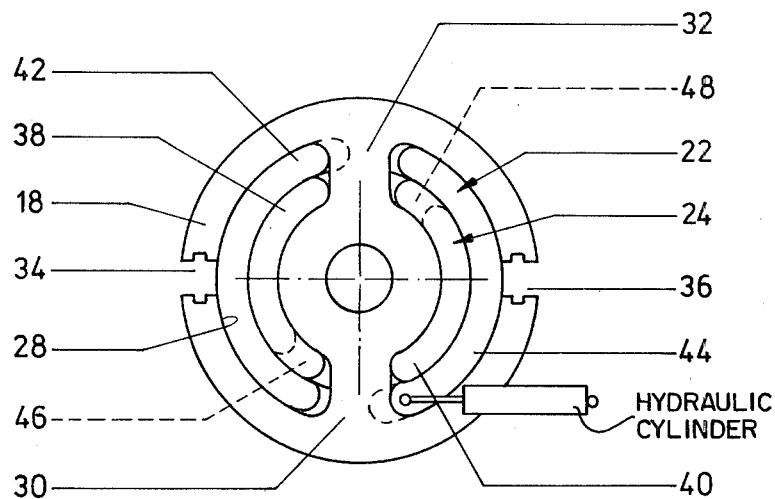

In this embodiment, tool parts 22 and 24 engage in the arcuate recesses 26 and 28 of the sheet 18. For this purpose, each of the two tool parts 22 and 24 comprise a base with two arcuate upwardly extending fingers or segments. The fingers of the inner tool part 24 are designated 38 and 40, and the fingers of the outer tool part 22 are designated 42 and 44. All fingers are bevelled at their upper free ends in order to facilitate their introduction into recesses 26 and 28 of sheet 18. As shown in FIG. 2(b), fingers 38 and 42 as well as fingers 40 and 44 are disposed radially, arranged directly adjacent to one another, and engaged in recesses 26 and 28 with relatively slight clearance. The base of the two tool parts 22 and 24 is selected to correspond to the purpose of the part. For example, a rotating drive can engage tool part 22 and an axial drive can also be coupled to tool part 22. In this preferred embodiment, the axial drive is actuated only when tool part 22 is brought by the turntable into position below stack 12.

The base of inner tool part 24 is advantageously shaped so that sheets 18 in the position shown in FIG. 2(a) are stacked on the base of the tool part 22 on crosspiece 30 and 32. In this manner, two definite but relatively small or narrow supporting surfaces are provided for the lowermost sheet 18. As discussed below, the oppositely directed forces which are necessary for the separation of the sheets directly engage a small portion of crosspieces 30 and 32 above these supporting surfaces.

Fingers 38 and 40 include diametrically opposed unilateral recesses 46 and 48. Tool parts 22 and 24 acting as a whole cooperate during operation of the device with two or more locks 50 on the lower end of magazine 14. Locks 50 support sheets 18 in magazine 14 when locks 50 are in the radially inward extending active position shown in FIG. 2(a). Locks 50 release sheets 18 when locks 50 are in a radially outward withdrawn or inoperative position, so that sheets 18 spill out of the bottom of magazine 14.

The device depicted in FIGS. 2(a) and 2(b) operates in the following manner. First, both tool parts 22 and 24 are moved into the angular position with reference to the sheet 18 as indicated by the solid lines in FIG. 2(b). Entering from below, tool parts 22 and 24 pass into arcuate recesses 26 and 28 which are flush with fingers 38, 40, 42, and 44 until crosspieces 30 and 32 of lowermost sheet 18 come into contact with the base of inner tool part 24. In this first step, the only movement involved is a relative movement between sheet stack 12 and the tool part 22 and 24. Thus, it makes no difference whether magazine 14 is lowered with reference to turntable 20, the latter is raised, or tool parts 22 and 24 are raised with reference to turntable 20 and magazine 14. In the latter case, a lift drive would also be provided for inner tool part 24; otherwise a rigid connection with turntable 20 would suffice.

After the fingers 38, 40, 42, and 44 of tool parts 22 and 24 have passed into sheets 18 so that sheets 18 press against the base of inner tool part 24, outer tool part 22 is turned clockwise as viewed in FIG. 2(b) by a relatively small angle until the forward ends of fingers 42 and 44 assume the position shown in dashed lines. With this rotational movement, the lowermost sheets 18 of stack 12, to the extent that these sheets 18 are disposed in the region of fingers 42 and 44, are rotated along with tool part 24. Thus, crosspieces 30 and 32 of these sheets 18 are moved into recesses 46 and 48 of fingers 38 and 40 of inner tool part 24. The difference in height or the axial distance between the upper edges of fingers 42 and 44 and the uppermost edges of recesses 46 and 48 should be equal to about the thickness of one sheet. In this manner, the lowermost sheet 18 remaining in stack 12 does not rotate but instead is held in place by the axially extending fingers 38 and 40 of inner tool part 24 which are fixed and nonrotatable. At the same time, the last sheet engaged by rotatable tool part 22 is carried thereby and thus there is a sliding movement between these two sheets. However, this relative angular motion between the sheets is so small that the edges of recesses 26 and 28 or notches 34 and 36 cannot slide over each other and consequently there is no catching together of the two sheets in these areas. The effective edges of tool parts 22 and 24 that cooperate in the relative rotation of the sheets contact the flanks of crosspieces 30 and 32 after traveling a very short distance. For such short distances, one need not fear tolerances which can be fairly large. The upper edges of lateral recesses 46 and 48 in fingers 38 and 40 can therefore be disposed quite precisely above the upper edges of fingers 42 and 44. It should also be noted that because of the short distance of travel of the tool edges engaging the sheet, the flexibility of the sheet does not effect this movement.

After the rotational movement of outer tool part 22 and the lower sheet 18 carried along by outer tool part 22 relative to the unrotatable inner tool part 24 and the remaining upper sheets 18 in stack 12 that are held by inner tool part 24, fingers 42 and 44 of outer tool part 22 are below crosspieces 30 and 32 of the sheets remaining in stack 12 while the upper ends of fingers 38 and 40 of the inner tool part 24 have passed over the lower sheets 18 which were rotated into lateral recesses 46 and 48. In this position, an axial movement between the two tool parts 22 and 24, can take place. Preferably, outer tool part 22 is lifted relative to inner tool part 24. As a result of this movement, the adjacent sheets 18 which had been previously turned relative to one another are separated in a direction normal to their main plane. As outer tool part 22 pushes the stack containing the remaining sheets 18 upward, inner tool part 24 holds stationary or pulls downward the lower packet of sheets 18 engaged in recesses 46 and 48. The plane of separation between the lower packet of sheets and stack 12 occurs between the upper edge of fingers 42 and 44 and the upper edge of recesses 46 and 48.

The axial movement described above which results in the separation of the adjacent sheets 18 is advantageously performed at the level of lock 50. Alternatively, the packet of sheets 18 can be separated first and then, as a whole together with tool parts 22 and 24, the packet of sheets 18 can be axially moved with reference to magazine 14 to a position where locks 50 can move in radially from the outside into the formed separation gap between the adjacent sheets 18. After locks 50 are in the extended, operative position, the lower packet of sheets 18 held in positive engagement in recesses 46 and 48 can be moved downward by movement of tool parts 22 and 24 relative to magazine 14. For example, the packet of sheets 18 can be moved to another processing station by turning of turntable 20, by another conveying mechanism, or even by manual means. As the packet of sheets 18 are positively held by tool parts 22 and 24, they can even be turned upside down for further processing without falling from device 10. With this embodiment, it would also be possible to form larger sheet packets from half packets of sheets which are rotated 180° with reference to each other about the axis of the stack so that differences in sheet thickness that occur because of a wedge shaped sheet cross section can be balanced out. Both the rotation of individual sheets or of a packet of sheets to avoid projecting burrs and the rotating of the upper half of a packet relative to the lower half by 180° are known in the art and can be effected mechanically. It should be noted that device 10 described above is particularly suited for such manipulation of the sheets because from the beginning of the operation of device 10, device 10 holds the sheets in positive engagement so that the sheets can easily be guided as desired. It should also be clearly evident that the orientation of sheet stack 12 during separation of a wanted packet of sheets does not effect the functioning of tool parts 22 and 24. Stack 12 could even be horizontal, if desired. The operation of device 10 is also equally capable of taking off a packet of sheets from either the lower or upper end of the stack.

As shown in FIG. 2(a), the base of outer tool part 22 is disposed sufficiently below the base of inner tool part 24, so that the lowermost sheet, even during the axial relative movement of the two tool parts, is always braced only by the base of the inner tool part 24 and does not come into contact with the base of outer tool part 22. If the base of tool part 22 is not sufficiently below the base of tool part 24, then during the axial movement not only the upper sheets remaining in the stack but also the lower sheets to be taken off of the stack would be lifted. In order to be able to vary the height of the packet of sheets to be taken off, the height of recesses 46 and 48 can be designed according to the maximum height. In this manner, device 10 can be set for any lower heights desired by the insertion of spacers in inner tool part 24 which cause a reduction in the distance between the base and the upper edge of recesses 46 and 48.

Figure 3A:
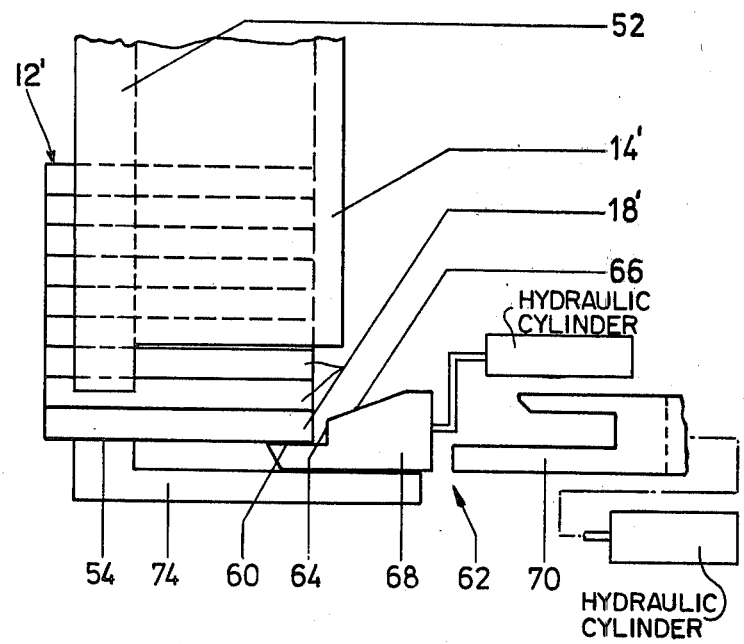
FIGS. 3(a) and 3(b) are a lateral view and a top view of another embodiment of a device according to the present invention.
Figure 3B:
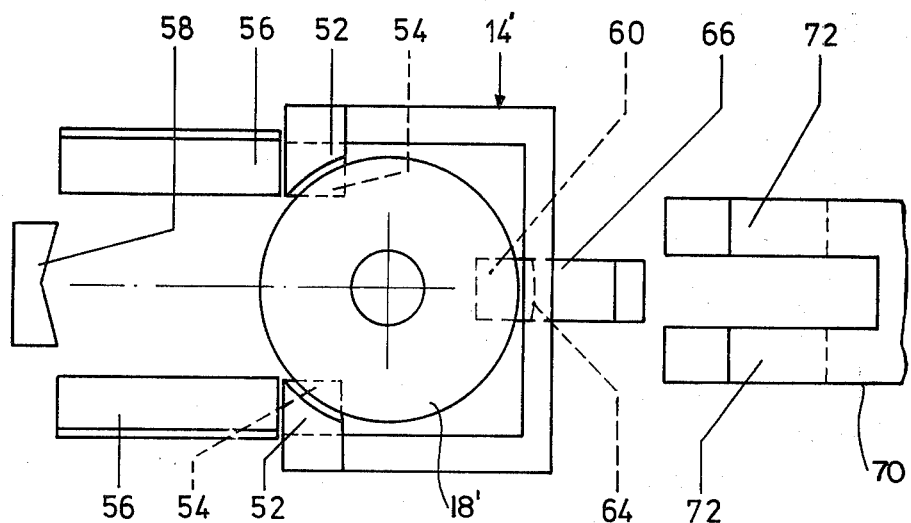

While device 10 described above is primarily intended for taking off a sheet or a packet of sheets from a stack of sheets, the embodiment of the invention depicted in FIG. 3(a) and 3(b) is primarily intended for the taking off of one or only a few sheets from the lower end of a stack of sheets. In this embodiment, sheet stack 12' is received in a vertical magazine 14' that restrains sheets 18' about their peripheries. The vertical walls or guides 52 of magazine 14' are spaced a distance of somewhat more than the thickness of one sheet 18' over two relatively small support surfaces 54 on which the lowermost sheet 18' rests. Thus, there is a gap between surfaces 54 and the lower end of guides 52 as shown in FIG. 3(a) through which the lowermost sheet 18' is pushed from magazine 14' toward the left. As the lowermost sheet 18' is pushed from stack 12', the lowermost sheet 18' is received in guide rails 56. Each lowermost sheet 18' is individually pushed to a stop 58 from where sheet 18' can be conveyed for further processing. Preferably, guide rails 56 are joined to support surfaces 54.

In addition to resting on surfaces 54, the lowermost sheet 18' of stack 12' rests initially on another relatively small support surface 60. Surface 60 is formed from the forward end of a pusher 62 which is radially movable with reference to stack 12'. In addition to support surface 60, pusher 62 has a forward surface 64 which is used to push the lowermost sheet 18' toward the left and out of magazine 14'. Surface 64 is about as high, or somewhat less than, the thickness of a single sheet 18'. Rising upward from forward surface 64 is a wedge surface 66. As pusher 62 moves toward the left, wedge surface 66 obliquely engages the second lowermost sheet 18' and lifts stack 12'.

As depicted in FIGS. 3(a) and 3(b), pusher 62 is comprised of two parts that are movable relative to one another; a part 68 which is made like a wedge as described above, and a part 70 which is like a fork. After wedge shaped part 68 travels a relatively short distance such that the lowermost sheet 18' has only been pushed so far to the left that the recess edges of the lowermost sheet 18' do not abut on recess edges of the sheet above, upper prongs 72 of part 70 enter the oblique separation gap caused by wedge shaped surface 66 on either side of wedge shaped pusher part 68. Part 70 thereby completely separates the lowermost remaining sheet 18' and all sheets 18' in stack 12' from the lowermost sheet 18' before the lowermost sheet 18' is pushed farther out of magazine 14. At the same time, prongs 72 function to hold and guide the lowermost sheet 18' in its horizontal position. For this reason, prongs 72 enter the separation gap opened by wedge surface 66 as soon as possible because the remaining sheets 18' of stack 12' which are engaged obliquely by wedge surface 66 press on the lowermost sheet at support surface 54. If not for prongs 72, this weight load could cause the lowermost sheet 18' to be pressed down on supporting surface 54 and to be tilted up off of surface 60 to the extent that wedge surface 66 would slide under the lowermost sheet 18'. After prongs 72 have been introduced into the separation gap, the two parts 68 and 70 travel as a unit. In this embodiment, pusher 62 slides on a base 74 under magazine 14'. Obviously, other guides and supports of pusher 62 would be possible. For example, it would be possible to have wedge shaped pusher part 68 slide on forklike pusher part 70. Also, supporting surface 60 could be located on one or both pusher parts 68 and 70. A suitable drive for pusher parts 68 and 70 would be hydraulic power cylinders. As such drive mechanisms are well known in the art, they have been omitted from the drawings.

In some cases, it may be possible to omit pusher part 70 where it appears that the oblique separation caused by wedge surface 66 between the two lowermost sheets is sufficient to avoid tilting problems while the lowermost sheet is being pushed out. The omission of part 70 depends on the sheet cut, the position of support surfaces 54, and the possible use of outer guides on rails 56.

In the embodiment depicted in FIGS. 3(a) and 3(b), the lower edges of the vertical walls or guides 52 of magazine 14' are a tool part which holds the secondmost lower sheet 18' remaining in stack 12' while pusher 62 pushes the lowermost sheet 18' from magazine 14'. With reference to the lowermost sheet 18', the points of engagement of guides 52 and part 68 are almost diametrically opposite each other. While this relatively large distance between the points of engagement could be a problem where thickness tolerances added up in a large packet of sheets being removed from a stack, it is not a problem where only one or a few sheets are separated from the stack because any tolerances cannot add up.

It should be noted that in a large plant for the manufacture of stators, it would be possible to use the device depicted in FIGS. 2(a) and 2(b) in cooperation with the device depicted in FIGS. 3(a) and 3(b). For example, the tool depicted in FIGS. 2(a) and 2(b) could form sheet packets necessary for the stators with the exception of the last one or two sheets. These missing sheets could then be prepared by the device depicted in FIGS. 3(a) and 3(b), and these sheets then laid on the sheet packet in such a way that there would be no sharp stamping burrs toward the outside of the finished stators.

We claim:

1. A device for the separating and taking off of one or more notched stamped sheets from a stack of sheets comprising:
    a magazine for receiving the stack of notched stamped sheets; and
    a tool operatively disposed adjacent said magazine comprising first and second tool parts which are movable relative to one another;
    said first tool part including a first surface for engaging the notched sheets to cause the sheets to slide on one another in the plane of separation of the stack, the sliding movement of the sheets being of a limited distance such that the sheets do not come into engagement in the region of the notches;
    at least one of said first and second tool parts including a second surface for engaging and applying pressure against at least one location of the sheets which is exposed during the relative sliding movement between sliding sheets so that the sliding sheets are separated from one another in a direction normal to the plane of separation, and such that thereafter a relative transverse movement between the sliding sheets can take place without danger of catching.

2. A device as claimed in claim 1 wherein said first and second tool parts are rotatably and axially movable with reference to one another about an axis normal to the planes of the sheets in the stack.

3. A device as claimed in claim 2 wherein said second tool part further includes at least one relatively small supporting surface to support the outermost sheet to be taken off of the stack, said supporting surface being closely adjacent said first surface and a counter surface of said second tool part engaging the outermost sheet remaining in the stack.

4. A device as claimed in claim 3 wherein said second tool part has two small supporting surfaces which are diametrically opposite to one another with reference to the middle of the sheet;
    wherein said first tool part has two of said first surfaces and said second tool part has two of said counter surfaces;
    and wherein each of said two small supporting surfaces are closely adjacent to respective ones of said first surfaces and of said counter surfaces.

5. A device as claimed in claim 3 wherein both said first and said second tool parts include a holding surface which exerts a force on an exposed location of one of the sliding sheets normal to the plane of the sheets.

6. A device as claimed in claim 2 wherein said first tool part has first fingers which extend into recesses of the sheets whereby said first fingers press with lateral surfaces against lateral surfaces of the recesses of the sheets to be taken off and the free ends of said first fingers press against exposed locations of the outermost sheet remaining in the stack;
    and wherein said second tool part has second fingers which also extend into the recesses of the sheets, said second fingers being provided with axial recesses whereby said second fingers counter-press against the lateral surfaces of the recesses of the sheet remaining in the stack and the outer axial end surfaces of said lateral recesses engage exposed locations of the last sheet that is taken off.

7. A device as claimed in claim 6 wherein during the sliding movement of the sheets, the outer axial end surfaces of said lateral recesses have an axial displacement from the free ends of said first fingers which corresponds substantially to the thickness of one sheet.

8. A device as claimed in claim 2 wherein said first tool part has one or more pairs of first fingers and said second tool part has one or more pairs of second fingers, said pairs of first and second fingers being arcuate in axial cross-section, concentric, and radially adjacent each other;
    whereby said pairs of first and second fingers fit into recesses in the sheets.

9. A device as claimed in claim 2 wherein the axial axis of the stack of sheets in said magazine is vertical or inclined, the sheets have recesses into which said first and second tool parts are received, the sheets to be removed are taken off of the lower end of the stack, and said magazine further includes locks which are movable at the lower end of said magazine crosswise thereto such that after said first and second tool parts have entered into the recesses of the sheets from below and moved axially relative to one another to provide a separation gap between the sliding sheets, said locks are moved into the separation gap to support the sheets remaining in the stack.

10. A device as claimed in claim 1 wherein said first and second tool parts are movable, with respect to one another, parallel with the planes of the sheets; said first tool including a forward surface which presses against a side edge of the sheets to be taken off and a wedge surface which exerts a force against the adjacent side edge of the outermost sheet remaining in the stack to produce a separation gap.

11. A device as claimed in claim 10 wherein said first tool part includes first and second pushers which are movable relative to one another, said first pusher having said forward surface and said wedge surface and said second pusher being introduced into the separation gap produced by said wedge surface to completely separate the two adjacent sheets.

12. A device as claimed in claim 11 wherein said second pusher which is introduced into the separation gap has a guide part which engages the sheets being taken off to hold the sheets being taken off in the same plane.

13. A device as claimed in claim 11 wherein said second pusher has prongs which extend around both sides of said first pusher into the separation gap.

14. A device as claimed in claim 10 wherein the stack of sheets rests on three relatively small support surfaces and wherein one of said small support surfaces is located on said first tool part.

15. A device as claimed in claim 14 wherein the other two support surfaces are located, with reference to the supporting surface on said first tool part, under the lateral bordering edges of the outermost sheet;

and wherein said second tool part has stop surfaces which oppose said forward surface of said first tool part and which are located at a distance of at least one sheet thickness above said support surfaces.

* * * * *